March 26, 1935. S. M. DAY 1,995,637
POWER SUPPLY SYSTEM
Filed June 14, 1934
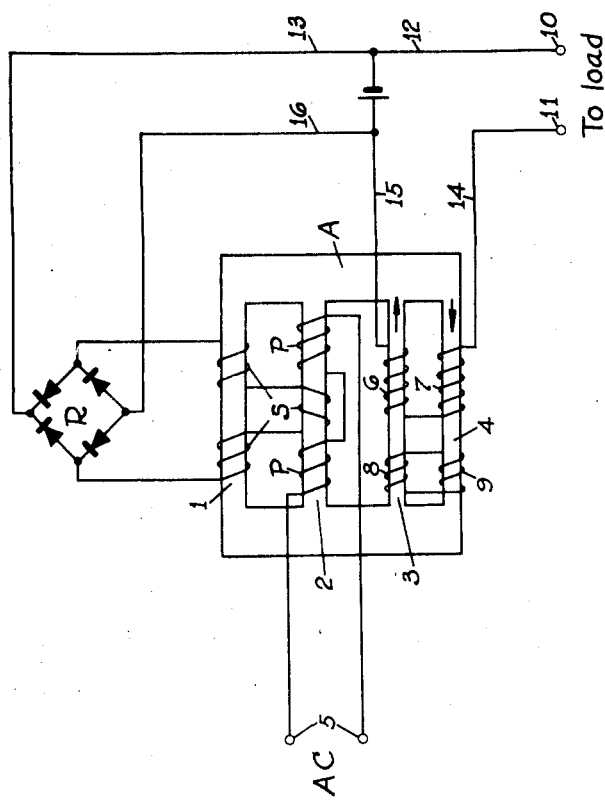
INVENTOR
S. M. Day,
BY Neil D. Preston,
his ATTORNEY Patented Mar. 26, 1935

1,995,637

UNITED STATES PATENT OFFICE 1,995,637

POWER SUPPLY SYSTEM

Salisbury M. Day, Rochester, N. Y., assignor to General Railway Signal Company, Rochester, N. Y.

Application June 14, 1934, Serial No. 730,652

6 Claims. (Cl. 175—363)

This invention relates to power supply systems, and more particularly to an organization of a transformer and rectifier for supplying direct current from an alternating current source to circuits having variable loads, in connection with which it may be desirable to use a battery as a reserve supply, and in which it is disadvantageous to have to any material extent alternating current supplied to such load.

Considering the invention in its application to circuits having variable loads, in order to have proper performance it is desirable, for reasons commonly known in the art, to maintain the voltage applied to the circuit comparatively constant. With the ordinary arrangement of a transformer and rectifier for supplying direct current to a circuit from an alternating current source, an adjustment is made to supply a certain amount of rectified alternating current to the load circuit as a compromise for varying load conditions; and a change in the load is accompanied by a variation in the voltage applied to the circuit on account of the voltage drop through the rectifier, and by reason of the regulating characteristics of the transformer, with the result that any substantial variation in the load causes the voltage at the rectifier terminals to change from its desired value.

For these and other reasons, it has been the practice to use a battery to supply current to the load circuit in addition to the transformer and rectifier, not only to provide a reserve supply to maintain energization of the circuit in case of failure of the alternating current supply, but also to maintain the voltage at the load terminals as nearly constant as practicable. In this arrangement, the battery supplies more or less of the track circuit current; and if a storage battery is used, a compromise adjustment of the transformer voltage has to be made which will keep the battery charged. In case of the primary battery, which has certain advantages from the standpoint of reserve supply, the adjustment of the transformer voltage has a further limitation in that it is undesirable and injurious to the battery to impress upon it for any substantial period of time, a voltage sufficient to establish a reverse current through the battery.

In view of these and other considerations, one object of this invention is to provide a transformer which will automatically vary its secondary voltage applied to the rectifier, within limits, in response to load changes and the amount of current supplied to the circuit, so as to maintain the rectified alternating current voltage across the circuit, and likewise to reduce the supply of current from the battery, if used as a reserve source, to substantially zero, or such small currents as may be desirable to keep the battery in operating condition, such automatic regulation being further accomplished without producing any appreciable amount of alternating current in the output circuit.

More specifically, the invention relates to a transformer used in connection with a rectifier to supply direct current to a circuit of variable load, in which the change in the load current automatically increases and decreases, within limits, the secondary voltage of the transformer, thereby obtaining from the rectifier a substantially constant voltage for a certain range of current variation in the load circuit. In the preferred form of the invention, this automatic regulation is accomplished by varying the permeability of a magnetic shunt for the magnetic circuit coupling the primary and secondary coils of the transformer, in accordance with changes in the load current, so that more or less of the primary flux acts upon the secondary coil, said magnetic shunt and the control windings thereon being so arranged that no alternating current is produced in the load circuit. This variable magnetic shunt does however not affect all of the secondary winding in the form of the invention shown, because part of the secondary winding is located on the core portion with the primary winding, so that the magnetic shunt cannot shunt out this part of the secondary winding.

Other objects, characteristic features, and advantages of the invention will be in part apparent as the description progresses, and will in part be discussed hereinafter.

The accompanying drawing shows diagrammatically, one specific form of the invention, as applied to a variable load circuit.

Referring to the drawing the transformer embodying this invention comprises a laminated core A, formed with four parallel core portions 1, 2, 3, and 4, which have relative dimensions or cross sections selected in accordance with the principles hereinafter explained. On core portion 2 is the primary P of the transformer, connected to the terminals 5 from a suitable source of alternating current. The adjacent core portion 1 carries a portion of the secondary winding S of the transformer, the remaining part of the secondary winding S being contained on the core portion 2, which secondary winding S is connected to a full-wave rectifier R, shown conventionally. This rectifier is of usual and well-known construction, preferably of the dry-plate or copper-oxide type.

The automatic regulation of the secondary voltage desired is obtained through the action of control windings 6 and 7 on the two parallel core portions 3 and 4. These control windings 6 and 7 comprise the same number of turns, and are so wound and connected in series as to send flux through the core portions 3 and 4 in opposite parallel directions, as indicated by the arrows; or, in other words, to act cumulatively to send flux around in a local magnetic circuit including said core portions 3 and 4 and the parts of the core joining their ends.

These control windings 6 and 7 are included in the output circuit of the rectifier R. Thus, if 10 and 11 are the output terminals for the device, one terminal 10 is connected by wires 12 and 13 to one output terminal of the rectifier R, and the other terminal 11 is connected by wire 14 to one of the control windings 7, the other control winding 6 being connected by wires 15 and 16 to the other output terminal of the rectifier R.

The dimensions of the core portions of the transformer core A, the number of turns in the windings and the like are, of course, designed and proportioned to fit the applied alternating current voltage and the load characteristics. It will be evident that the alternating flux provided by current in the primary P has a magnetic circuit through the secondary core portion 1, and another magnetic circuit through the control core portions 3 and 4 in multiple. In other words, the main primary flux divides, part passing through that part of the secondary winding S located on the core portion 1, and part passing in multiple through the core portions 3 and 4 carrying the control windings 6 and 7. The portion of the primary flux in the cores 3 and 4, which may be conveniently considered as leakage flux, depends upon the magnetic reluctance of these cores in comparison with the reluctance through the secondary core 1. Stated another way, the core portions 3 and 4 form a magnetic shunt for the core portion 1 of the magnetic circuit coupling the primary winding P and the secondary winding S. The reluctance of the core portions 3 and 4 depends upon the permeability; and in turn the permeability depends upon the flux density. The direct current in the output circuit of the transformer flows through the control windings 3 and 4, which tend to send uni-directional flux in specified directions through the core portions 3 and 4. This uni-directional flux together with alternating flux supplied from the primary P, produce a certain flux density in these core portions 3 and 4, and thereby determine their permeability, and their magnetic reluctance.

Assuming a certain load current, there is a corresponding excitation of the control coils 6 and 7, a corresponding ratio of the secondary flux and leakage flux, and a corresponding secondary voltage as compared with the secondary voltage for some other load current. Suppose now that the resistance of the load circuit changes to increase the current; and it is desirable to increase the secondary voltage to compensate for the resistance drop through the rectifier and the reduction in secondary voltage that would otherwise occur due to ordinary transformer regulation. In accordance with this invention, such an increase in load current increases the excitation of the control windings 6 and 7, and thereby the flux density in the leakage core portions 3 and 4, which in turn reduces the permeability and increases the reluctance, so that more of the primary flux passes through the core portion 1, and raises the voltage induced in secondary winding S.

Conversely, if the resistance or other factor of the load circuit changes to decrease the current, less direct current flows in the control windings 6 and 7, thereby reducing the flux density in the leakage core portions 3 and 4, which in turn varies the permeability to lower the reluctance, with the result that more of the primary flux passes through the leakage path comprising the core portions 3 and 4, and less flux passes through that part of the secondary winding S, located on core portion 1, to decrease the secondary voltage.

The alternating flux derived from the primary and flowing in the core portions 3 and 4 tends to induce voltage in the control windings 6 and 7; but the parts are so proportioned that the alternating voltages of these windings 6 and 7 are equal and opposite so that no alternating current flows in the output circuit. To accomplish this result, the core portions 3 and 4 are of the same cross section to have the same reluctance, and the control windings 6 and 7 have the same number of turns. In order to take care of variations that may exist with ordinary manufacturing processes, balancing coils 8 and 9 are preferably employed to keep the alternating flux in the core portions 3 and 4 balanced and equal. These balancing coils 8 and 9 are in a closed circuit and are so wound and connected that the voltages induced therein by alternating flux in the core portions 3 and 4 oppose each other. If the relative reluctance in the core portions 3 and 4 should be such that more of the primary alternating flux tends to flow through the core portion 3, then the voltage induced in the balancing coil 8 would be greater than that in the other coil 9, and current would flow through the coils 8 and 9 in series, and in a direction to increase core portion 3. If desired, these balancing coils, illustrated as separate coils 8 and 9, may be formed by connecting a suitable portion of the end turns of the two control coils or windings 6 and 7. These flux dividing or balancing coils 8 and 9 also serve to render more effective the change of permeability of the core portions 3 and 4 due to the direct current flux, because they tend to make the alternating flux divide equally, so that the alternating flux will not take alternate paths through core portions 3 and 4, that is, take the path in which the uni-directional flux opposes the alternating flux.

As already pointed out, the secondary coil S is in part located on core portion 1, so that it may be shunted by the magnetic shunt 3—4, and is in part located on the core portion 2, so that it cannot be magnetically shunted from the primary coil P that is, the secondary winding S is in part closely coupled to the primary coil P and is in part loosely coupled thereto. It is readily apparent that this construction permits the secondary winding to be so distributed on core portions 1 and 2 as to get any desired degree of regulation. For instance if most of the secondary winding S is located on core portion 2 a greater secondary load may be carried but less regulation may be accomplished, whereas if the greater part of secondary winding S is located on core portion 1 more regulation may be accomplished and less secondary load carried.

A transformer and rectifier organization, provided with automatic regulation in accordance with this invention may be used very advantageously to supply direct current to track circuits used in railway signaling systems, with or without a battery as a reserve supply. The drawing illustrates an application of the invention to a conventional load circuit with a battery B as a reserve supply connected across the wires 13 and 16, or the output terminals of the rectifier R, with the polarity of the battery opposing that of the rectifier.

It is found that the parts may be designed and proportioned and the number of turns in the primary coil P selected, so that as the load on the load circuit increases or decreases, the voltage of the secondary coil S will vary correspondingly, and cause the rectifier to supply substantially all of the current. Under these conditions the battery B is called upon to supply such small currents that a primary battery may be used for the reserve supply, and its useful life be increased. If a storage battery is used for the battery B, the automatic regulation feature of this invention assures that this storage battery will be fully charged at all times. In the case of a primary battery, the battery is kept in better condition if it normally supplies a small amount of current, and with the type of primary battery commonly used, it is injuriously affected by sustained reverse voltages tending to send charging current through it. These, and other conditions, may be satisfied by the automatic regulating or compounding feature of this invention.

Having thus shown and described one embodiment of my invention in considerable detail and having shown it applied to a conventional load circuit it is desired to be understood that the invention may be applied to other uses, as for instance to a load circuit without the aid of a battery in which case the rectifier furnishes all of the necessary current. It is also to be understood that the present invention may take other forms than the one illustrated, without departing from the scope thereof, and that the form illustrated has been selected to facilitate disclosure of the underlying principles thereof and without the thought of limiting my invention to the particular form illustrated in the drawing, all without departing from the spirit or scope of the invention, except as demanded by the scope of the appended claims.

What I claim as new is:—

1. A system for supplying direct current to a variable load circuit comprising in combination with a battery, a transformer including a primary coil and a secondary winding and having duplicate parallel core portions forming a shunt for the magnetic circuit coupling the primary coil to a portion only of the secondary winding, a rectifier for rectifying the current supplied by said secondary winding to said battery, and coils on said core portions included in the load circuit and acting to vary the permeability of said shunt and thereby increase the secondary voltage as the load current increases, said coils being so wound and connected that opposing voltages are induced in said coils by the alternating flux in said core portions.

2. A system for supplying direct current to a variable load circuit comprising in combination with a primary battery; a transformer including a primary coil and a secondary winding, a first coil closely coupled to said primary coil and a secoil coil loosely coupled to said primary coil, and having duplicate parallel core portions forming a shunt for the magnetic circuit coupling the primary coil to said second coil; a rectifier for rectifying the current supplied by said secondary winding to said battery; and coils on said core portions included in series in the load circuit, and acting to vary the permeability of said shunt and thereby increase the secondary voltage as the load current increases; said coils being so wound and connected that such voltages as are induced therein by the alternating flux in said core portions are equal and oppose each other.

3. A system for supplying direct current to a variable load circuit comprising in combination with a primary battery; a transformer including a primary coil and a secondary winding, the secondary winding of which has a first winding which is closely coupled to said primary coil, and a second coil which is loosely coupled to said primary coil, and having duplicate parallel core portions forming a shunt for the magnetic circuit coupling the primary coil to said second coil; a rectifier for rectifying the current supplied by said secondary winding to said battery; coils on said duplicate parallel core portions connected in series to substantially equally divide the alternating fluxes in said duplicate parallel core portions; and other coils on said core portions included in series in the load circuit and acting to vary the permeability of said shunt, and thereby increase the secondary voltage as the load current increases; said other coils being so wound and connected in series that such voltages as are induced therein by the alternating flux in said core portion are equal and oppose each other.

4. In combination with a variable direct current load, of means for supplying a substantially constant uni-directional voltage thereto derived from a source of alternating current comprising a magnetizable core including core portions connected in multiple, a primary winding on one of said core portions, a secondary winding including two coils in series one contained on said one core portion and another coil contained on a second core portion, a rectifier connected to be supplied with alternating current from said transformer and supplying direct current to said load, and a control coil contained on a third core portion, said control coil being connected in series with said rectifier and said direct current load and changing the reluctance of said third core portion and in turn its ability to shunt said primary winding, whereby an increase of direct current drawn by said load will result in an increase of voltage induced in said secondary winding.

5. In combination with a variable direct current load; of means for supplying a substantially constant uni-directional voltage thereto derived from a source of alternating current comprising, a magnetizable core including four core portions connected in multiple, a primary winding on one of said core portions, a secondary winding including two coils in series one contained on said one core portion and another coil contained on a second core portion, a rectifier connected to be supplied with alternating current from said transformer and supplying direct current to said load, and two control coils, one contained on a third core portion and the other located on a fourth core portion, said control coils being connected in series to cause current therein to set up local flux passing through said third and fourth core portions in series, and included in series with said rectifier and said direct current load and changing the reluctance of said third and fourth core portions and in turn its ability to shunt said primary winding, whereby an increase of direct current drawn by said load will result in an increase of voltage induced in said secondary winding.

6. In combination with a variable direct current load; of means for supplying a substantially constant uni-directional voltage thereto derived from a source of alternating current comprising, a magnetizable core including four core portions connected in multiple, a primary winding on one of said core portions, a secondary winding including two coils in series, one contained on said one core portion and another coil contained on a second core portion, a rectifier connected to be supplied with alternating current from said transformer and supplying direct current to said load, two control coils, one contained on a third core portion and the other located on a fourth core portion, said control coils being connected in series to cause current therein to set up local flux passing through said third and fourth core portions in series, and included in series with said rectifier and said direct current load and changing the reluctance of said third and fourth core portions and in turn its ability to shunt said primary winding, whereby an increase of direct current drawn by said load will result in an increase of voltage induced in said secondary winding, and other means for causing the alternating flux passing through said third and fourth core portion in multiple to be substantially equally divided.

SALISBURY M. DAY.